(12) United States Patent
Mays et al.

(10) Patent No.: US 10,144,253 B2
(45) Date of Patent: Dec. 4, 2018

(54) TIRE PRESSURE OPTIMIZATION SYSTEM

(71) Applicant: OMNITRACS, LLC, Dallas, TX (US)

(72) Inventors: Wesley M. Mays, Coppell, TX (US);
James Fortuna, Dallas, TX (US)

(73) Assignee: OMNITRACS, LLC, Dallas, TX (US)

( * ) Notice: Subject to any disclaimer, the term of this patent is extended or adjusted under 35 U.S.C. 154(b) by 293 days.

(21) Appl. No.: 15/011,202

(22) Filed: Jan. 29, 2016

(65) Prior Publication Data

US 2017/0217261 A1    Aug. 3, 2017

(51) Int. Cl.
*B60C 23/04* (2006.01)
*G01L 17/00* (2006.01)
*G07C 5/00* (2006.01)
*B60C 23/00* (2006.01)

(52) U.S. Cl.
CPC ........ *B60C 23/0479* (2013.01); *B60C 23/003* (2013.01); *B60C 23/041* (2013.01); *B60C 23/0401* (2013.01); *B60C 23/0486* (2013.01); *G01L 17/005* (2013.01); *G07C 5/008* (2013.01)

(58) Field of Classification Search
CPC ............ B60C 23/0479; B60C 23/0486; B60C 23/003; B60C 23/0401; B60C 23/041; G07C 5/008; G01L 17/005
See application file for complete search history.

(56) References Cited

U.S. PATENT DOCUMENTS 7,672,756 B2    3/2010  Breed

2007/0222568 A1    9/2007  Morar et al.
2009/0096599 A1    4/2009  Kranz
2012/0176233 A1*   7/2012  Petrucelli ............ B60C 23/0401
                                                            340/447

FOREIGN PATENT DOCUMENTS

| CN | 203126408 U | 8/2013 |
| EP | 1 172 236 A2 | 1/2002 |
| JP | 2004-314771 A | 11/2004 |
| WO | WO 2013/022435 A1 | 2/2013 |
| WO | WO 2015/052439 A1 | 4/2015 |

OTHER PUBLICATIONS

International Search Report dated Jun. 8, 2017 issued in International Patent Application No. PCT/US2017/015505.

* cited by examiner

*Primary Examiner* — Kyoung Lee
(74) *Attorney, Agent, or Firm* — Arent Fox LLP (57) ABSTRACT

Aspects of the present disclosure are generally related to one or more systems, methods, and devices for providing an integrated tire inflation system, mounted on each tire, wheel, rim, axle, or structure of the vehicle, that communicates with a remote device (e.g., communication device located in the cab of the vehicle and/or a remote network entity) and obtains an optimal tire pressure from the network entity that is calculated to maximize fuel economy, tread life, load, or an environmental condition. In some examples, the integrated telematics system may periodically measure and transmit data associated with the tire to the communication device in the cab and/or to a network entity that may calculate the optimal tire pressure for each tire on the vehicle. The integrated telematics system may receive the optimal tire pressure information from the communication device and/or the network entity and automatically adjust the tire pressure accordingly.

20 Claims, 6 Drawing Sheets

TIRE PRESSURE OPTIMIZATION SYSTEM

BACKGROUND

The cost of replacing tires in a commercial vehicle is the second largest expense, in some estimates representing 11% of the total vehicle operating costs. Only fuel costs (ranging between 28%-37% of the total vehicle operating costs) outpace the cost of replacing the tires. Improper maintenance of tire pressure may result in significantly higher fuel costs and lowered tire life. For example, under-inflated tires can lower gas mileage by 0.3% for every 1 psi drop in pressure. Such rising costs may be significant for fleet operators managing hundreds or thousands of commercial vehicles.

On-board automatic inflation systems are currently available for use on trucks and other vehicles in an attempt to address aspects of the above problem. Such systems automatically deliver make-up air to a vehicle tire in the event that the tire is punctured or begins to leak for other reasons. For a given trailer, truck, or other vehicle axle assembly, automatic tire inflation systems can be installed for monitoring and maintaining a desired air pressure in each tire individually. However, conventional automatic tire inflation systems pressurize the tire to a predetermined and fixed pressure. For example, in current systems, the automatic tire inflation system can be configured to maintain a tire pressure of 95 pounds per square inch (psi). Accordingly, as the tire begins to leak air (e.g., either because of being punctured or other conditions), the conventional automatic tire inflation system will adjust the tire pressure back to 95 psi. However, pressurizing the tire to a predetermined or fixed pressure may not be ideal for all conditions.

Additionally, because the automatic inflation systems continuously provide air to a tire when the air pressure of the tire falls below the predetermined or fixed value, the driver or fleet operator may continue to operate the vehicle with the tire has been structurally compromised (e.g., punctured). In such cases, irreparable damage may occur to the tire or the vehicle (e.g., a tire blowout during operation may result in accident that may be fatal).

Thus, improvements in automatic inflation systems are desired.

SUMMARY

Aspects of the present disclosure are generally related to one or more systems, methods, and devices for providing an integrated telematics system, mounted on one or more of tire, wheel, rim, or axle of the vehicle, that communicates with a remote device (e.g., communication device located in the cab of the vehicle and/or a remote network entity) and obtains an optimal tire pressure from the network entity that is a calculated target tire pressure value based on maximizing fuel economy, tread life, vehicle load capacity, or an environmental condition. In some examples, the integrated telematics system may periodically (e.g., every 30 minutes) measure data associated with the tire (e.g., one or more of tire pressure, time temperature, tire tread depth, air temperature in the tire, the rate of change of air volume, the status of the air inflation system, or the rate of movement of the tire) and at least one external environment condition exerting forces on the tire (e.g., external temperature). In some aspects, the integrated telematics system may also maintain tire-specific information such as tire serial number, tire position (e.g., position on the vehicle), tire size, and date of manufacture. The measured data in conjunction with the tire-specific information may be periodically transmitted to the communication device in the cab and/or to a network entity that may calculate the optimal tire pressure for each tire on the vehicle in order to maximize fuel economy, tread life, or lowest operating cost. The integrated telematics system may receive the optimal tire pressure information from the communication device and/or the network entity and automatically adjust the tire pressure (e.g., by inflating or deflating) the tire accordingly.

In one aspect of the present disclosure, a method for pressurizing a tire associated with a vehicle is disclosed. The method may include measuring, at a tire inflation device, tire-specific data. In some examples, the tire-specific data may include at least one of a tire pressure, tire temperature, tire tread depth, rate of change of air volume, or a rate of movement of the tire. The method may further include measuring, at the tire inflation device, at least one environment condition associated with the tire. In some examples, the at least one environment condition includes external air temperature. Additionally or alternatively, the method may include transmitting the tire-specific data and the at least one environment condition associated with the tire from the tire inflation device to a network entity. In some examples, the method may further comprise receiving, from the network entity in response to the tire-specific data and the at least one environment condition associated with the tire, an optimal tire pressure information calculated to maximize fuel economy of the vehicle and tread life of the tire. Accordingly, the method of the present disclosure may adjust, by the tire inflation device, the tire pressure of the tire based on the optimal tire pressure information.

In another aspect of the present disclosure, an apparatus for pressurizing a tire associated with a vehicle is disclosed. The apparatus may include a processor and a memory. In some aspects, the memory may comprise instructions executable by the processor to measure, at a tire inflation device, tire-specific data. In some examples, the tire-specific data may include at least one of a tire pressure, tire temperature, tire tread depth, rate of change of air volume, or a rate of movement of the tire. The apparatus may further include measuring, at the tire inflation device, at least one environment condition associated with the tire. In some examples, the at least one environment condition includes external air temperature. Additionally or alternatively, the instructions may be executable by the processor to transmit the tire-specific data and the at least one environment condition associated with the tire from the tire inflation device to a network entity. In some examples, the apparatus may further comprise receiving, from the network entity in response to the tire-specific data and the at least one environment condition associated with the tire, an optimal tire pressure information calculated to maximize fuel economy of the vehicle and tread life of the tire. Accordingly, the apparatus of the present disclosure may adjust, by the tire inflation device, the tire pressure of the tire based on the optimal tire pressure information.

In yet another aspect of the present disclosure, a computer-readable medium for pressurizing a tire associated with a vehicle is disclosed. The computer readable medium may include instructions executable to measure, at a tire inflation device, tire-specific data. In some examples, the tire-specific data may include at least one of a tire pressure, tire temperature, tire tread depth, rate of change of air volume, or a rate of movement of the tire. The computer readable medium may further include measuring, at the tire inflation device, at least one environment condition associated with the tire. In some examples, the at least one environment condition includes external air temperature. Additionally or alternatively, computer readable medium may further include instructions executable to transmit the tire-specific data and the at least one environment condition associated with the tire from the tire inflation device to a network entity. In some examples, the computer readable medium may further comprise receiving, from the network entity in response to the tire-specific data and the at least one environment condition associated with the tire, an optimal tire pressure information calculated to maximize fuel economy of the vehicle and tread life of the tire. Accordingly, the computer readable medium of the present disclosure may adjust, by the tire inflation device, the tire pressure of the tire based on the optimal tire pressure information.

To the accomplishment of the foregoing and related ends, the one or more aspects of the present disclosure comprise the features hereinafter fully described and particularly pointed out in the claims. The following description and the annexed drawings set forth in detail certain illustrative features of the one or more aspects of the present disclosure. These features are indicative, however, of but a few of the various ways in which the principles of various aspects of the present disclosure may be employed, and this description is intended to include all such aspects and their equivalents.

BRIEF DESCRIPTION OF THE DRAWINGS

The disclosed aspects of the present disclosure will hereinafter be described in conjunction with the appended drawings, provided to illustrate and not to limit the disclosed aspects, wherein like designations denote like elements, where a dashed line may indicate an optional element or action, and in which.

DETAILED DESCRIPTION

Various aspects will now be described with reference to the drawings. In the following description, for purposes of explanation, numerous specific details are set forth in order to provide a thorough understanding of one or more aspects. It should be understood, however, that such aspect(s) may be practiced without these specific details.

As discussed above, conventional automatic tire inflation systems are limited in their ability to adjust the tire pressure beyond the predetermined boundaries established for each tire and/or vehicle type. Additionally, given that the automatic tire inflation systems continuously adjust the tire pressure when the pressure drops below a predetermined value, a driver of the vehicle on which the tire is mounted is generally unaware of any structural flaws that may be present in one or more of the tires on the vehicle. However, such inflexibility may be counter intuitive for maintaining efficient values for fuel economy, tread life, or overall total operating costs.

Aspects of the present disclosure address the above-identified problem by implementing a tire inflation device that is attached to each tire of the vehicle, and offers increased operating efficiency and lower operating costs over the conventional systems by dynamically adjusting a tire pressure (e.g., an air and/or other gas pressure within the tire) to a target tire pressure value based on maximizing fuel economy, tread life, or vehicle load capacity. The tire inflation device may be powered by an energy generator that produces mechanical energy based on a relative motion within the tire inflation device. Additionally or alternatively, in some aspects, the transceiver is powered by an electromagnetic energy generator that produces electrical energy based on a relative motion within the tire inflation device. For instance, the tire inflation device may utilize the relative motion within the tire inflation device to produce electrical energy that could be used to power the tire inflation device and/or supply reserve power to an energy storage device. In some aspects, the tire inflation device may maintain tire-specific information such as the tire serial number, tire position on the vehicle, tire size, and date of manufacture of the tire. Additionally or alternatively, the tire inflation device may periodically measure data from the tire and the external environment (e.g., outside temperature). In some aspects, the measured data may include the tire pressure, the tire temperature, the tire tread depth, the air temperature in the tire, the rate of change of air volume, the status of the air inflation system, the rate of movement of the tire (e.g., revolutions per minute (RPM)), and other pertinent data associated with the tire. Both the tire-specific information and the measured data may be transmitted to a remote network entity that may calculate the optimal tire pressure to maximize fuel economy, or to maximize tread life, or to reduce operating costs. In some examples "operating costs" may refer to fuel costs or tire maintenance costs (e.g., replacing tires).

Additionally or alternatively, the tire inflation device may also measure the rate of air flow that the automatic tire inflation system is inserting into the tire in order to determine whether there is a structural flaw with the tire itself. For example, if the rate of flow that the automatic tire inflation system is high, aspects of the present disclosure may deduce that the tire may be punctured. Conversely, if the rate of flow from the automatic tire inflation system is low or sporadic, aspects of the present disclosure may deduce that the automatic tire inflation system is only adjusting the tire pressure for normal loss of pressure. Accordingly, in some examples, aspects of the present disclosure may provide a system that may warn the user (e.g., by providing in-cabin warning) of any flaws with the tire based on the rate of air flow provided by the automatic tire inflation system.

Figure 1:
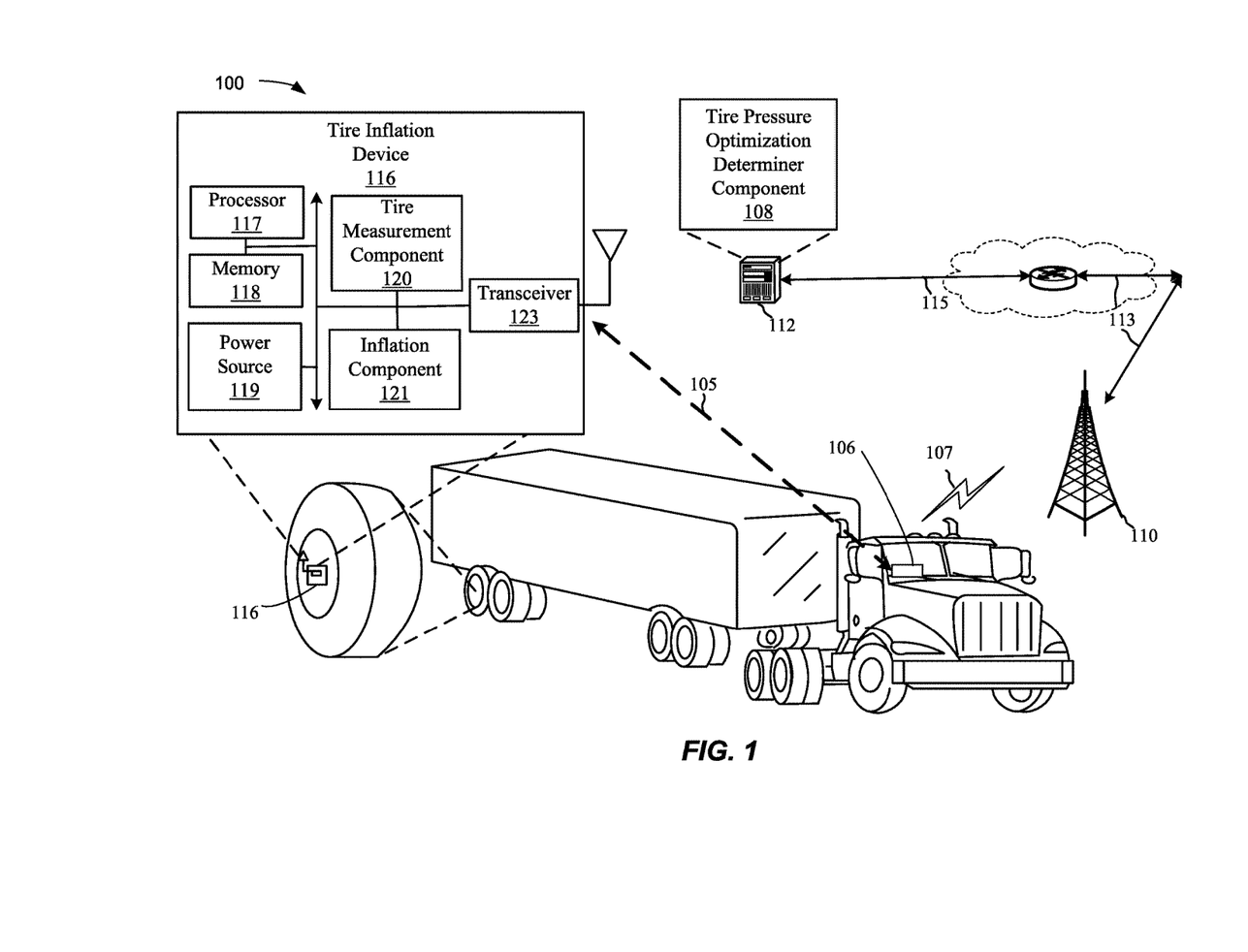
FIG. 1 illustrates a wireless communication system implementing various aspects of the present disclosure.

FIG. 1 illustrates one example of a tire pressure optimization system 100 including a tire pressure optimization determiner component 108 in communication with a tire inflation device 116 operable to dynamically adjust a tire pressure to meet a target tire pressure value in accordance with various aspects of the present disclosure. In some examples, the tire pressure optimization system 100 may include one or more fleet vehicles 104. The one or more fleet vehicles 104 may be in communication with a network device 112 via a base station 110. Specifically, the network device (e.g., NMC) 112 may be configured to communicate with one or more vehicles 104 via a communication device 106 located on each vehicle 104 or associated with each driver of each vehicle 104. In some aspects, the communication device 106 may include any type of mobile wireless communication device, such as but not limited to a mobile computing platform that includes, but is not limited to, an MCP 50, an MCP 100, an MCP 110, an MCP 200, and a TT210, and/or a communication device associated with the Roadnet platform, and/or a communication device associated with the XRS platform, and/or an intelligent vehicle gateway (IVG) device, each of the former devices or platforms sold by Omnitracs, LLC of Dallas, Tex. Accordingly, the communication device 106 and the network device 112 may exchange data via a wireless communication link (not shown) and backhaul link 113 by utilizing one or more base stations, access points (APs), and/or satellite communication. The network device 112 may provide user authentication, access authorization, tracking, internet protocol (IP) connectivity, and other access, routing, or mobility functions.

In some examples, the communication device 106 associated with vehicle 104 may periodically (e.g., every 5 mins) transmit or receive data from a tire inflation device 116 attached (or mounted) on one or more of tire(s), wheel(s), rim(s), or axle(s) of the vehicle. In some aspects, the tire inflation device 116 may include a processor 117 for processing information received from the communication device 106 and for controlling one or more features of the tire measurement component 120 for measuring tire-related parameters, inflation component 121 for controlling inflation or deflation of the tire, and/or transceiver 123 for wirelessly communicating with other devices. The tire inflation device 116 may additionally include memory 118 for storing information such as tire serial number, tire position on the vehicle (e.g., back right), tire size, data of manufacture, etc. In some aspects, the memory 118 may store information measured by the tire measurement component 120. For example, the tire measurement component 120 may periodically measure one or any combination of the tire pressure, the tire temperature, the tire tread depth, the air temperature in the tire, the rate of change of air volume, the status of the air inflation system, the rate of movement of the tire, and/or one or more environment conditions associated with the tire (e.g., external air temperature).

In one or more examples, the tire inflation device 116, via the transceiver 123 and antenna 124, may transmit the measured data and/or at least some portion of the stored information to the NMC 112. In some aspects, the measured data and/or stored information may first be transmitted from the tire inflation device 116 to the communication device 106, which in some aspects may be located in the cab or trailer of the vehicle 104 whereas in other aspects may be a mobile communication device carried by a driver of the vehicle, using short range communication technology (e.g., Bluetooth). In such scenario, the measured data and information may be routed via the communication device 106 to the NMC 112, and, more particularly, to the tire pressure optimization determiner component 108.

In some aspects, the tire pressure optimization determiner component 108 may receive the measured data and stored information from the tire inflation device 116 and use this data and information in an optimization function to calculate an optimal tire pressure. For example, in an aspect, tire pressure optimization determiner component 108 may include a processor and/or memory operable to execute at least one optimization function to calculate an optimal tire pressure based on one or any combination of the tire pressure, the tire temperature, the tire tread depth, the air temperature in the tire, the rate of change of air volume, the status of the air inflation system, the rate of movement of the tire, and/or an environment condition. In some examples, identifying the "optimal" tire pressure may include calculating a target tire pressure value for maximizing fuel economy, or for maximizing tread life, or for maximizing vehicle load capacity, or for maximizing an environmental condition. Additionally or alternatively, the optimal tire pressure may be a target tire pressure value calculated based on the road surface (e.g., the rougher the road surface, a lower tire pressure may be "optimal," while smoother surface may require higher tire pressure). Similarly, the weather or other environment conditions may impact the determination of the optimal tire pressure by the tire pressure optimization system. Specifically, a tire pressure may drop by 1-2 pounds for every 10 degrees of temperature change. Thus, as the external temperature may drop, the tire pressure optimization determiner component 108 may identify higher than normal tire pressure as optimal and set the target tire pressure value accordingly. Conversely, during the periods where the external temperature may be 80 to over 1 degrees, the tire pressure optimization determiner component 108 may recommend a lower "optimal" tire pressure and set the target tire pressure value accordingly. Because commercial vehicles may traverse through varying environments on a cross-country trip, aspects of the present disclosure that automatically and dynamically adjust the tire pressure periodically (e.g., every 5-10 minutes) to account for varying factors may increase fuel efficiency and tire tread life. Further description relating to calculating "optimal" tire pressure is described with reference to FIG. 3.

Upon the tire pressure optimization determiner component 108 calculating the optimal tire pressure, the NMC 112 may transmit the optimal tire pressure information (e.g., corresponding to the target tire pressure value) back to the tire inflation device 116 via the communication device 106. In some examples, the transceiver 123 may receive the information transmitted by the NMC 112 and forward it to the processor 117 and/or inflation component 121 for processing. In one or more examples, the inflation component 121 may initiate automatic tire pressure adjustment (e.g., by inflating or deflating) the tire to the identified optimal tire pressure.

Additionally or alternatively, the inflation component 121 may measure the rate of air flow that the tire inflation device 116 is inserting into the tire during a predetermined time period in order to determine whether there is a structural flaw with the tire itself. For example, if the rate of flow is high (e.g., the tire inflation device 116 is continuously inflating the tire), the inflation component 121 may issue an alert or warning to the driver indicating that the tire may be punctured. Conversely, if the rate of flow from the automatic tire inflation system is low or sporadic, the inflation component 121 may forego warning.

In yet further examples, the tire inflation device 116 may include a power source 119 for producing electrical energy to power the tire inflation device 116. In some examples, the power source 119 may be a small electromagnetic energy generator that relies on the relative motion generated based on the revolutions of the tire to produce electrical energy. Thus, in some examples, the tire inflation device may be powered by an energy generator that produces mechanical energy based on a relative motion within the tire inflation device. Additionally or alternatively, in some aspects, the transceiver is powered by an electromagnetic energy generator that produces electrical energy based on a relative motion within the tire inflation device.

Figure 2:
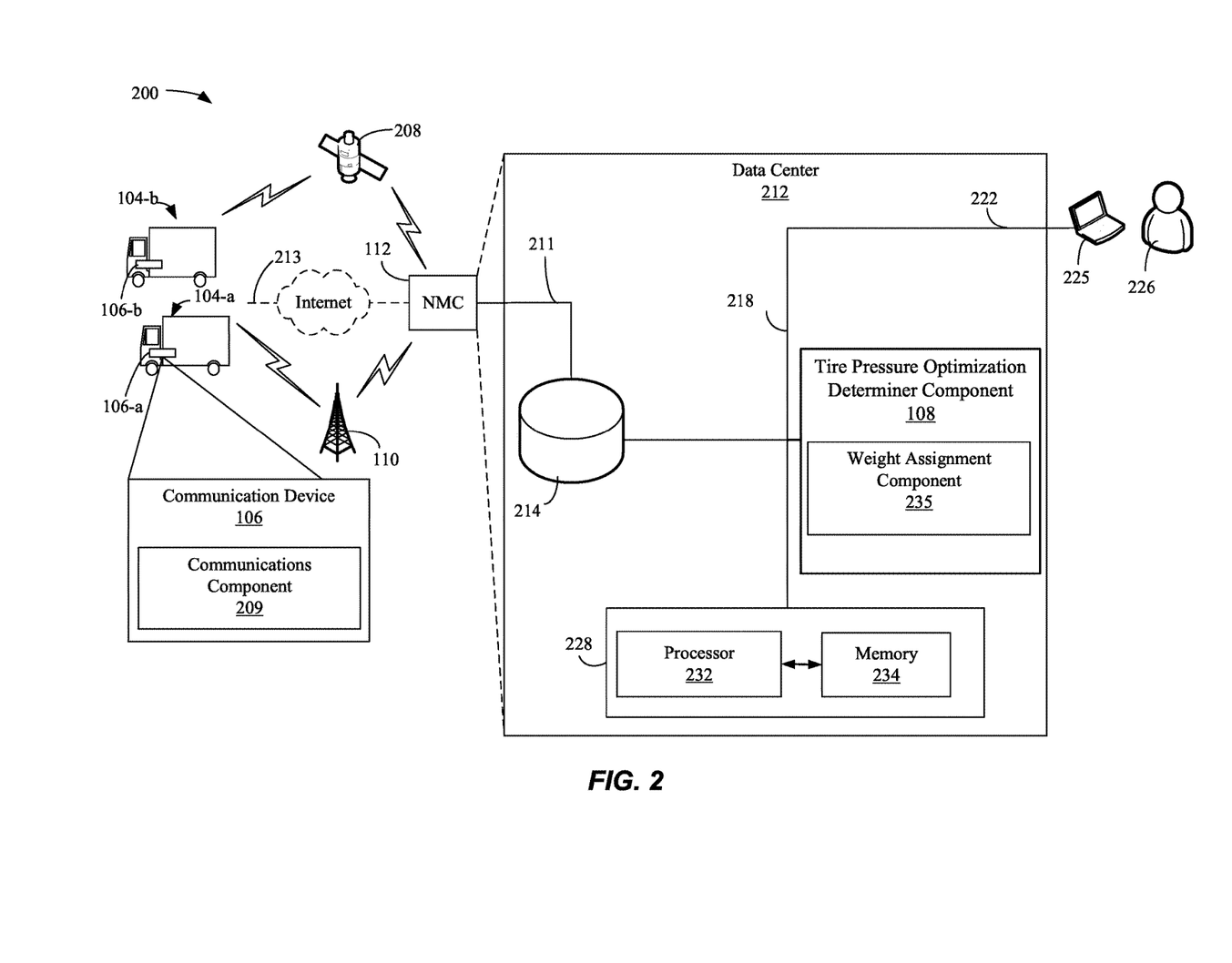
FIG. 2 is a functional block diagram of example elements of an aspect of a system in accordance with various aspects of the present disclosure.

Referring now to FIG. 2, in an aspect, a system 200 (e.g., a more detailed view of tire pressure optimization system 100 of FIG. 1) includes components for implementing the tire pressure optimization capability as described above in reference to FIG. 1. As used herein, the term "component" may be one of the parts that make up a device, may be hardware (e.g., a processor) or software (e.g., computer executable instructions or code stored on a computer-readable medium) or firmware (e.g., a combination of both), and may be divided into other components and/or distributed across one or more processors.

In an aspect, system 200 can comprise a network management center (NMC) 112 configured to communicate with one or more vehicles 104 via a communication device 106 located on each vehicle 104 or associated with each driver of each vehicle 104. The system 200 may include one or more fleets of vehicles 104, each fleet having at least one vehicle. Typically, a fleet could include as many tens, hundreds or thousands of vehicles. An example fleet 204 is illustrated as having two vehicles 104. Additional fleets (not shown) are contemplated, but not shown. In implementations, each communication device 106 is configured to collect and transmit data associated with the operation of the vehicle 104 to the NMC 112. In some aspects, the communication device 106 may include a communication component 209 configured to establish communication with the tire inflation device 116 and tire pressure optimization determiner component 108.

In some aspects, the tire pressure optimization system 108 may further include a weight assignment component 235 for assigning weights to various consideration factors (e.g., driver comfort, noise, tread life, fuel economy, blowout prevention, traction, etc.) in selecting the optimal tire pressure. An example of the mechanism of selecting the optimal tire pressure based on the varying considerations is described in greater detail with reference to FIG. 3.

In some implementations, communication device 106 may include a processor configured to execute one or more aspects of the communication component 209 with external devices such as NMC 112 and/or terminal device 225 via a communication network. The communication device 106 may also include a memory configured to store computer-readable code that may define all or part of the components 207 and also to store data associated with the components and/or communication device 106. As such, in an aspect, processor and memory of communication device 106 may be specially programmed to perform the functionality described herein. Communication device 106 may also include a user interface or display, a mobile application server, and a communications component 209 (e.g., including the one or more transceivers, and one or more of terrestrial and Wi-Fi modems, one or more antennae, a GPS component, and a satellite communications component).

As an example only, each vehicle 104 may be in bi-directional communication with NMC 112 over at least one communication channel. In the example shown in FIG. 2, each vehicle 104 is in bi-directional communication with the NMC 112 over at least one of a satellite-based communication system 208 or a terrestrial-based system 110 (e.g., a wireless communication system using a communication protocol/technology such as, but not limited to, GSM, CDMA, TDMA, WCDMA, EDGE, OFDM, GPRS, EV-DO, LTE, WiFi, Bluetooth, or, when the vehicle is stopped, via a wired connection 213 through the Internet). Depending on many factors, data may be exchanged with the vehicles 104 using one or both of the satellite communication system 208 and the terrestrial-based communication system 110.

In an aspect, many different types of data are collected and transferred from the vehicles 104 to the NMC 112. Examples of such data include, but are not limited to, vehicle performance data, driver performance data, critical events, messaging and position data, location delivery data, and many other types of data. All of the information that is communicated to and from the vehicles 104 may be processed via the NMC 112. The NMC 112 can be thought of as a data clearinghouse that receives all data that is transmitted to and received from the vehicles 104. Moreover, in an aspect, NMC 112 may include one or more back-end servers. Thus, in some aspects, the collected information (e.g., communication data or vehicle specific data) may periodically (e.g., every x minutes, where x is a whole number, or once a day, or upon availability of a wired or wireless connection) be transmitted from the communication device 106 to the NMC 112 for analysis and record keeping.

The system 200 also includes a data center 212, which may be part of or in communication with NMC 112. The data center 212 illustrates one possible implementation of a central repository for all of the data received from each of the vehicles 104. As an example, as mentioned above many different types of data are transmitted from the vehicles 104 to the NMC 112. In the case where data center 212 is in communication with NMC 112, the data may be transmitted via connection 211 to the data center 212. The connection 211 may comprise any wired or wireless dedicated connection, a broadband connection, or any other communication channel configured to transport the data. Moreover, in an aspect, data center 212 may include one or more back-end servers analyzing the one or more parameters transmitted from the one or more MCP(s) 106. Additionally or alternatively, data may also be exchanged between the plurality of communication device(s) 106 using, for example, peer-to-peer (P2P) communication without the involvement of the NMC 112.

In some aspect, the data center 212 may include a tire pressure optimization determiner component 108 as described with reference to FIG. 1. The tire pressure optimization determiner component 108 may receive data associated with the tire (e.g., tire pressure, time temperature, tire tread depth, air temperature in the tire, the rate of change of air volume, the status of the air inflation system, the rate of movement of the tire) and external environment conditions exerting forces on the tire (e.g., external temperature) from the communication device 106, which may have obtained the information from the tire inflation device 116. In some examples, the tire pressure optimization determiner component 108 may receive the relevant information directly from the tire inflation device 116 without relying on the communication device 106 to establish the communication link. In some aspects, the tire pressure optimization determiner component 108 may further be in communication with a terminal device 225, which may be a user interface portal, a web-based interface, a personal computer (PC), a laptop, a personal data assistant (PDA), a smart phone, a dedicated terminal, a dumb terminal, or any other device over which a user 226, such as a manager or operator responsible for monitoring a fleet of vehicles 104, can view the display or receive a printed report and/or manage operation of the tire pressure optimization system 100 (FIG. 1) or 200.

In an aspect, the data center 212 may include a data warehouse 214 for receiving the data from vehicles 104 relating to vehicle and/or driver performance (e.g., driver biometric data). In an aspect, for example, data center 212 may include any number of application servers and data stores, where each may be associated with a separate fleet and/or driver management or performance data. In an aspect, each application server and data store may include a processor, memory including volatile and non-volatile memory, specially-programmed operational software, a communication bus, an input/output mechanism, and other operational systems. Each application server may relate to one or more service platforms, such as but not limited to one or more Analytics platforms, one or more Enterprise Services platforms, one or more ROADNET Anywhere platforms, one or more ROADNET Transportation Suite platforms, one or more Sylectus Network platforms, and/or one or more XRS platforms offered by OMNITRACS, LLC of Dallas, Tex. For example, an application server may be a services portal (SP) server that receives, for example, messaging and positioning (M/P) data from each of the vehicles 104. Another application server, for example only, may include one or more servers related to safety and compliance, such as a quick deployment center (QDC) server that receives, for example, critical event (CE) data from each of the vehicles 104. Further, for example, another application server may be vehicle and driver performance data related to fuel usage and/or cost from each of the vehicles 104. Additionally, for example only, another application server may relate to asset management, such as a Vehicle Maintenance and Vehicle Inspection Report server that receives, for example, maintenance and/or inspection data from each of the vehicles 104. It should be understood that the above list of example servers is for illustrative purposes only, and data center 212 may include additional and/or different application servers, such as an application server configured for tire pressure optimization as described herein.

In an aspect, the tire pressure optimization determiner component 108 may be an analysis engine defined by or operating via a processing system 228, for example, connected via a system bus. In an aspect, the processing system 228 includes a processor 232 and a memory 234. In an example implementation, the functionality of tire pressure optimization determiner component 108 as described herein may be implemented in one or more hardware or firmware processor components of processor 232. For instance, although illustrated as being separate components, tire pressure optimization determiner component 108 may be a part of or in communication with processor 232. In another example implementation, the memory 234 can store the routines and/or functionality and/or one or more optimization functions, e.g., in the form of computer-readable code or instructions, and/or the corresponding data, that are associated with tire pressure optimization determiner component 108. In an aspect, the processor 232 can execute the stored routines (e.g., code) to implement the functionality of tire pressure optimization determiner component 108 that are described herein. Although shown as residing within the data center 212, the processing system 228 may reside elsewhere, and may be implemented as a distributed system in which the processor 232 and the memory 234 may include one or more processor and memories, and may be located in different places, such as at NMC 112 and/or one or more servers associated with NMC 112 or data center 212.

Figure 3:
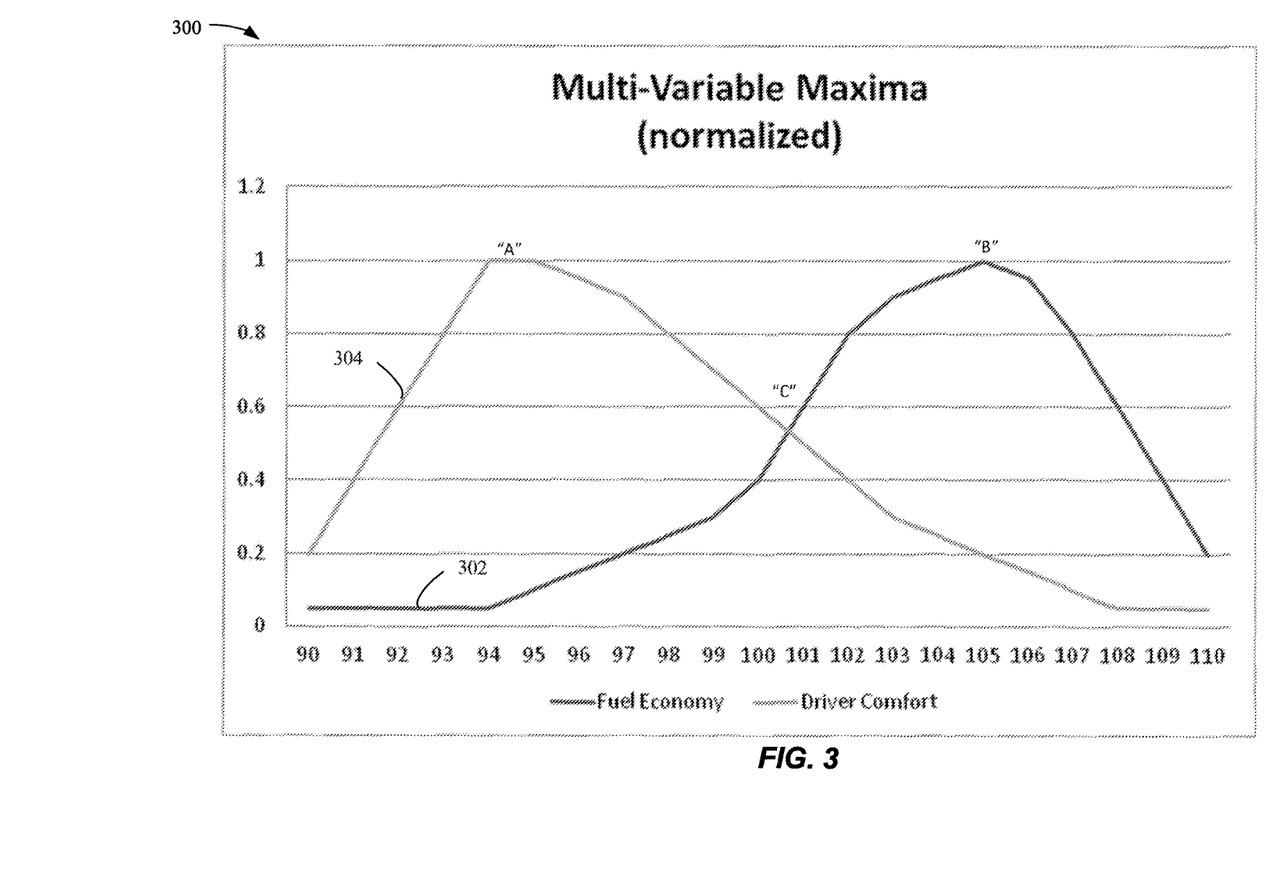
FIG. 3 is a diagram illustrating the mechanism of selecting an optimal tire pressure in accordance with various aspects of the present disclosure.

FIG. 3 includes a chart 300 having optimization curves or functions 302 and 304 that illustrate one non-limiting example of calculating optimal tire pressure based on varying parameters such as driver comfort and fuel economy. Although the chart 300 illustrates optimization curves or functions for only two consideration factors (fuel economy function 302 and driver comfort function 304), it should be understood that other implementations of the present disclosure may additionally select from additional optimization curves or functions corresponding to one or more of additional factors in determining an optimal tire pressure for the tire associated with the vehicle 104.

In the illustrated example, the horizontal axis may represent the tire pressure and the vertical axis the percentage of optimization. Thus, simply considering the fuel economy as the determinative factor without consideration of the driver comfort may result in the tire pressure optimization determiner component 108 selecting 105 PSI (Marker "B"; e.g., the highest percentage of optimization associated with fuel economy curve or function 302) as the target tire pressure value for the "optimal" tire pressure. In other examples, weighing the driver comfort without regard for fuel economy may yield a selection of 94 PSI (Marker "A"; e.g., the highest percentage of optimization associated with driver comfort curve or function 304) as the target tire pressure value for the most "optimal" tire pressure. Equally weighing both factors (e.g., fuel economy and driver comfort) may result in selection of 101 PSI (Marker "C"; e.g., the highest percentage of optimization associated with the intersection of fuel economy curve or function 302 and driver comfort curve or function 304) as the target tire pressure value for the "optimal" tire pressure.

As noted above, FIG. 3A only illustrates two factors for consideration in calculating the optimal tire pressure. In accordance with aspects of the present disclosure, the tire pressure optimization determiner component 108 may include one or more curves or functions that may be used to balance consideration of one or more of tire pressure, the tire temperature, the tire tread depth, the air temperature in the tire, the rate of change of air volume, the status of the air inflation system, the rate of movement of the tire, driver comfort, noise, traction and/or environment condition factors. In some examples, the tire pressure optimization determiner component 108 may assign a weight to each of the above factors, where the weight may be a different weight or a same weight for each factor.

For example, one common parameter that may be considered when setting the optimal tire pressure may be tread life. In such instance, the tread life may be dependent on the load (weight) of the vehicle and cargo. Under-inflated tires may tend to show wear on the outside edges of the tread, while over-inflated tires may show wear down the middle of the tread. Thus, in some aspects, by assigning a higher weight to the tread life factor over other factors, the tire pressure optimization determiner component 108 may select an optimal tire pressure that may result in the tire exhibiting equal wear throughout the tread, and thus maximizing tread life.

In other examples, where the surface upon which the vehicle 104 is traveling may require greater traction (e.g., surface covered with snow), the tire pressure optimization determiner component 108 may assign a greater weight to the traction factor over, for example, the driver comfort factor. With traction as the leading factor, the tire pressure optimization determiner component 108 may select an optimal tire pressure such that the weight of vehicle and the cargo is distributed evenly across the tread pattern of the tire, thereby allowing the tire to produce the largest contact area with the surface of the road. Accordingly, in some examples, the weight assignment component 235 may be dynamically adjusted between selection of varying considerations (e.g., one or more of tire pressure, the tire temperature, the tire tread depth, the air temperature in the tire, the rate of change of air volume, the status of the air inflation system, the rate of movement of the tire, driver comfort, noise, traction and/or environment condition) to select the optimal tire pressure that achieves lowest total operating cost.

Figure 4:
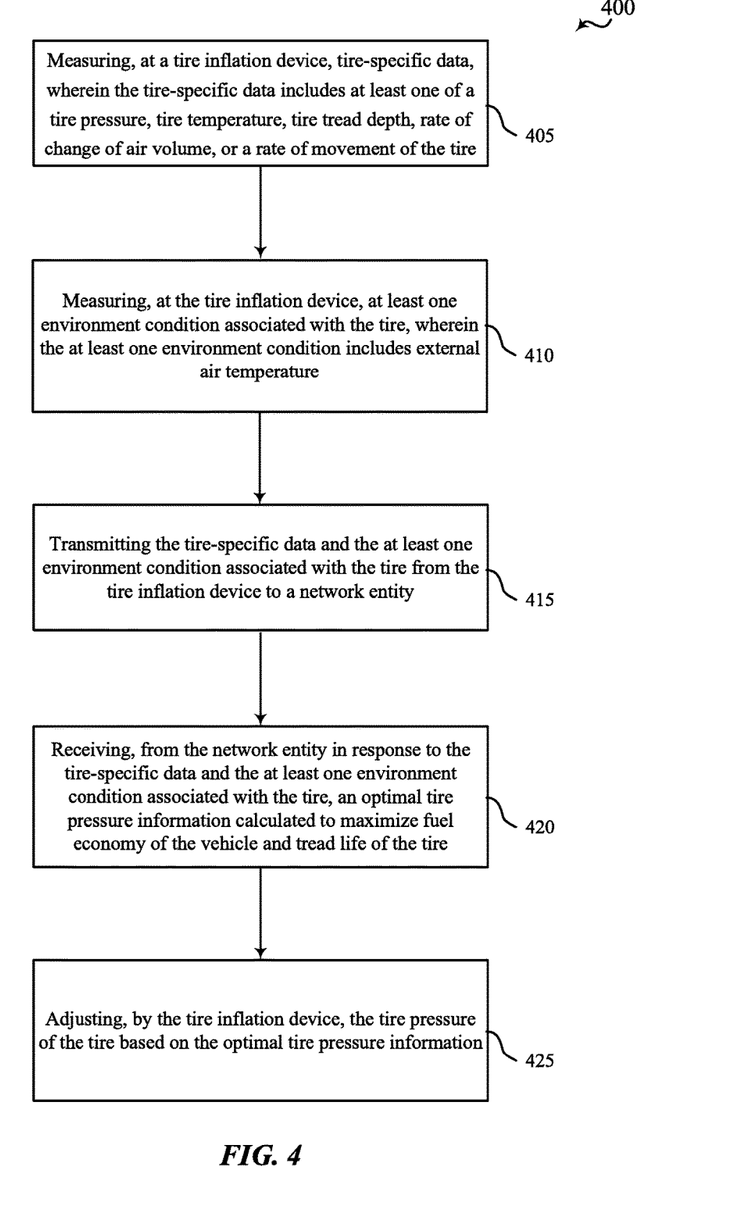
FIG. 4 is a flowchart of an aspect of a method in accordance with the present disclosure.

FIG. 4 illustrates one example of a method 400 of implementing tire pressure optimization system in accordance with various aspects of the present disclosure. In some aspects, the method 400 may be implemented by the tire inflation device 116 described with reference to FIGS. 1-2.

At block 405, the method 400 may include measuring, at a tire inflation device, tire-specific data, wherein the tire-specific data includes at least one of a tire pressure, tire temperature, tire tread depth, rate of change of air volume, or a rate of movement of the tire. Aspects of block 405 may be performed by the tire measurement component 120 described with reference to FIG. 1.

At block 410, the method 400 may include measuring, at the tire inflation device, at least one environment condition associated with the tire, wherein the at least one environment condition includes external air temperature. Aspects of block 410 may also be performed by the tire measurement component 120 described with reference to FIG. 1.

At block 415, the method 400 may include transmitting the tire-specific data and the at least one environment condition associated with the tire from the tire inflation device to a network entity. Aspects of block 415 may also be performed by the transceiver 123 described with reference to FIG. 1. In some aspects, the transceiver 123 may include a transmitter to establish communication with the communication device 106 and/or NMC 112.

At block 420, the method 400 may include receiving, from the network entity in response to the tire-specific data and the at least one environment condition associated with the tire, an optimal tire pressure information calculated to maximize fuel economy of the vehicle and tread life of the tire. In some aspects, the optimal tire pressure may be calculated by assigning equal weights to fuel economy and tread life of the tire. In other examples, additional factors and varying weights may be used. Aspects of block 420 may also be performed by the transceiver 123 described with reference to FIG. 1. In some aspects, the transceiver 123 may include a receiver to receive data from the communication device 106 and/or the NMC 112.

At block 425, the method 400 may include adjusting, by the tire inflation device, the tire pressure of the tire based on the optimal tire pressure information. Aspects of block 425 may be performed by the inflation component 121 described with reference to FIG. 1. In some aspects, the inflation component 121 may include a feedback loop that monitors the tire pressure in the tire during inflation and deflation such that the air flow may be terminated once the optimal tire pressure is reached.

Figure 5:
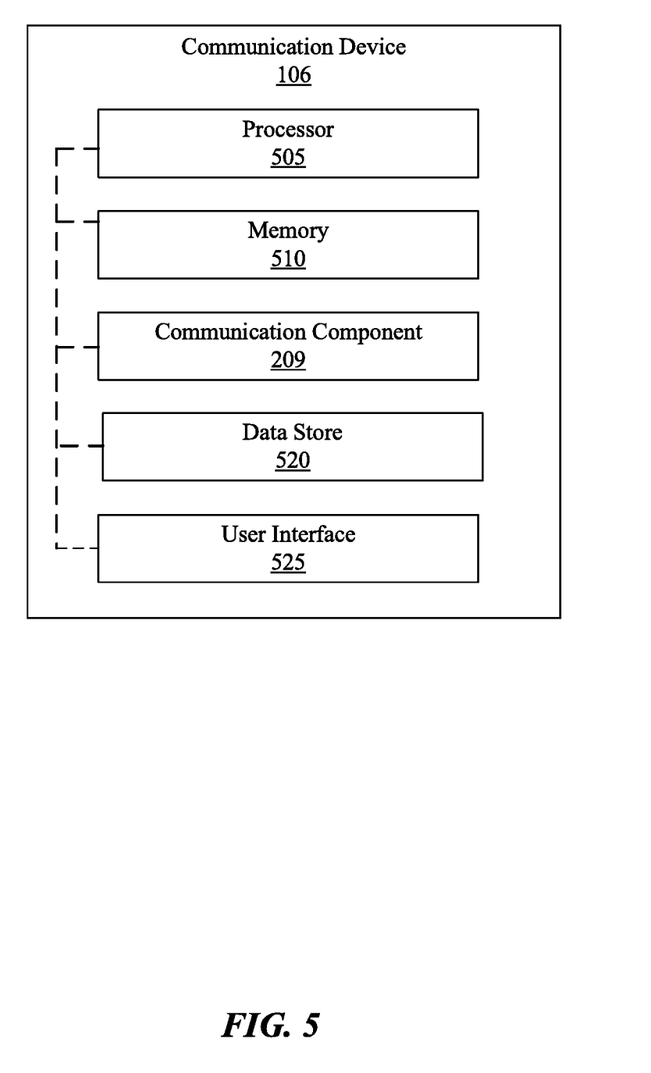
FIG. 5 is a block diagram of an example of an aspect of a communication device in accordance with the present disclosure.

Referring to FIG. 5, in an example that should not be construed as limiting, communication device 106 that may be associated with the vehicle 104 (e.g., included in the cabin or trailer of the vehicle 104) and/or the driver (e.g., a mobile communication device that may be carried by the driver). In some aspects, the communication device 106 may include additional components which may be implemented in specially programmed computer readable instructions or code, firmware, hardware, or some combination thereof.

In an aspect, features described herein with respect to the functions of communication device 106 in communicating with tire inflation device 116, NMC 112, and/or tire optimization determiner component 108 may be implemented in or executed using one or any combination of processor 505, memory 510, communications component 209, and data store 520. For example, communication component 209 may be defined or otherwise programmed as one or more processor components of processor 505. Further, for example, communication component 209 may be defined as a computer-readable medium (e.g., a non-transitory computer-readable medium) stored in memory 510 and/or data store 520 and executed by processor 505. Moreover, for example, inputs and outputs relating to operations of communication component 209 may provide a bus between the components of computer device or an interface for communication with external devices or components. Processor 505 can include a single or multiple set of processors or multi-core processors. Moreover, processor 505 can be implemented as an integrated processing system and/or a distributed processing system.

Memory 510 may operate to allow storing and retrieval of data used herein and/or local versions of applications and/or software and/or instructions or code being executed by processor 505, such as to perform the respective functions of communication component 209 described herein. Memory 510 can include any type of memory usable by a computer, such as random access memory (RAM), read only memory (ROM), tapes, magnetic discs, optical discs, volatile memory, non-volatile memory, and any combination thereof.

Communications component 209 is operable to establish and maintain communications with one or more internal components/components or external devices utilizing hardware, software, and services as described herein. For example, the communications component 209 may establish communication with the tire inflation device 116 or the NMC device 112. The communication component 209 may further carry communications between components on the communication device 106, as well as between user and external devices, such as devices located across a communications network and/or devices serially or locally connected to communication device 106. For example, communications component 209 may include one or more buses, and may further include transmit chain components and receive chain components associated with a transmitter and receiver, respectively, or a transceiver, operable for interfacing with external devices.

Additionally, data store 520, which can be any suitable combination of hardware and/or software, which provides for mass storage of information, databases, and programs employed in connection with aspects described herein. For example, data store 520 may be a data repository for applications not currently being executed by processor 505.

The communication device 106 may additionally include a user interface component 525 operable to receive inputs from a user, and further operable to generate outputs for presentation to the user. User interface component 525 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 525 may include one or more output devices, including but not limited to a display, a speaker, a haptic feedback mechanism, a printer, any other mechanism capable of presenting an output to a user, or any combination thereof.

Figure 6:
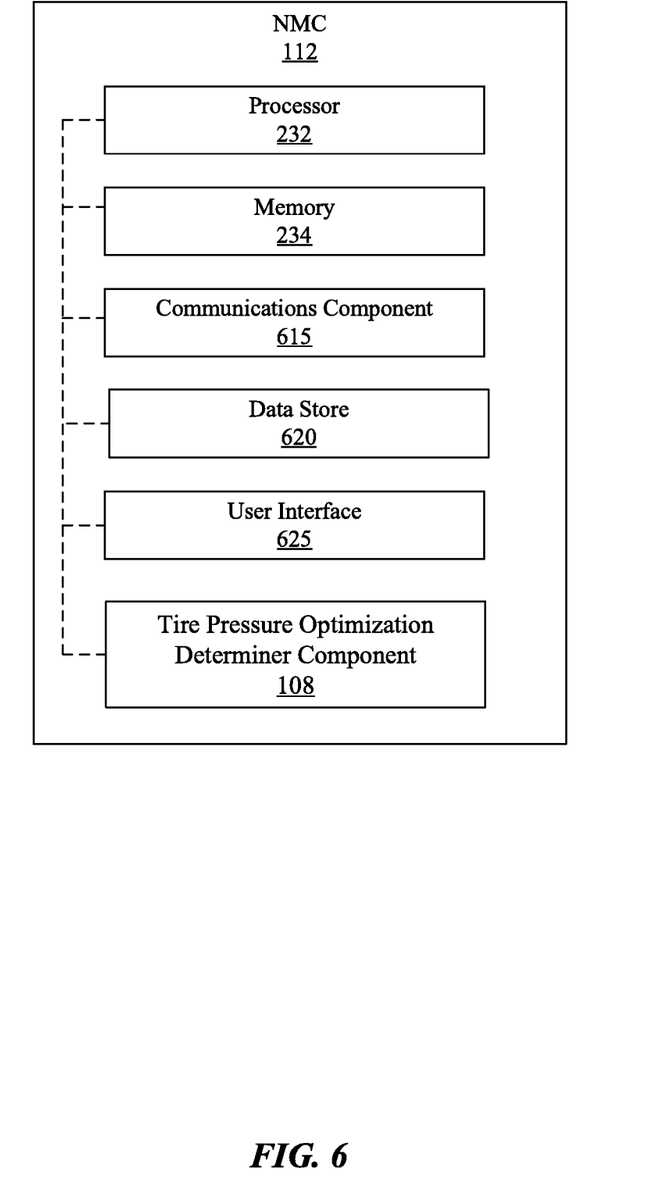
FIG. 6 is a block diagram of an example of an aspect of a network management center (NMC) in accordance with the present disclosure.

Referring to FIG. 6, in an example that should not be construed as limiting, NMC 112 may include additional components for implementing aspects of the present disclosure, which may be implemented in specially programmed computer readable instructions or code, firmware, hardware, or some combination thereof. In some examples, the NMC 112 may include a tire pressure optimization determiner component 108 as described with reference to FIGS. 1-2.

In an aspect, the features of tire pressure optimization determiner component 108 described herein may be implemented in or executed using one or any combination of processor 232, memory 234, communications component 615, and data store 620. For example, tire pressure optimization determiner component 108 may be defined or otherwise programmed as one or more processor components of processor 232. Further, for example, tire pressure optimization determiner component 108 may be defined as a computer-readable medium (e.g., a non-transitory computer-readable medium) stored in memory 234 and/or data store 610 and executed by processor 232. Moreover, for example, inputs and outputs relating to operations of tire pressure optimization determiner component 108 may be provided or supported by communications component 615, which may provide a bus between the components/components of NMC 112 or an interface for communication with external devices or components/components.

Processor 232 can include a single or multiple set of processors or multi-core processors. Moreover, processor 232 can be implemented as an integrated processing system and/or a distributed processing system.

Memory 234 may be operable for storing and retrieving data used herein and/or local versions of applications and/or software and/or instructions or code being executed by processor 232, such as to perform the respective functions of the respective entities described herein. Memory 234 can include any type of memory usable by a computer, such as random access memory (RAM), read only memory (ROM), tapes, magnetic discs, optical discs, volatile memory, non-volatile memory, and any combination thereof.

Communications component 615 may be operable to establish and maintain communications with one or more internal components/components and/or external devices utilizing hardware, software, and services as described herein. Communications component 615 may carry communications between components on NMC 112, as well as between user and external devices, such as devices located across a communications network and/or devices serially or locally connected to NMC 112. For example, communications component 615 may include one or more buses, and may further include transmit chain components and receive chain components associated with a transmitter and receiver, respectively, or a transceiver, operable for interfacing with external devices.

Additionally, data store 620, which can be any suitable combination of hardware and/or software, which provides for mass storage of information, databases, and programs employed in connection with aspects described herein. For example, data store 620 may be a data repository for applications not currently being executed by processor 232.

NMC 112 may additionally include a user interface component 625 operable to receive inputs from a user, and further operable to generate outputs for presentation to the user. User interface component 625 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 626 may include one or more output devices, including but not limited to a display, a speaker, a haptic feedback mechanism, a printer, any other mechanism capable of presenting an output to a user, or any combination thereof.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the figures which may illustrate various process flows.

In the above description, the term "computer readable medium" may include files having executable content, such as: object code, scripts, byte code, markup language files, and patches. In addition, a "software product" referred to herein, may also include files that are not executable in nature, such as documents that may need to be opened or other data files that need to be accessed.

As used in this description, the terms "component," "database," "component," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blue-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method for pressurizing a tire associated with a vehicle, comprising:
   measuring, at a tire inflation device, tire-specific data, wherein the tire-specific data includes at least one of a tire pressure, tire temperature, tire tread depth, rate of change of air volume, or a rate of movement of the tire;
   measuring, at the tire inflation device, at least one environment condition associated with the tire, wherein the at least one environment condition includes external air temperature;
   transmitting, by a transceiver, the tire-specific data and the at least one environment condition associated with the tire from the tire inflation device to a network entity;
   receiving, by the transceiver from the network entity in response to the tire-specific data and the at least one environment condition associated with the tire, an optimal tire pressure information calculated to maximize fuel economy of the vehicle and tread life of the tire; and
   adjusting, by the tire inflation device in response to receiving the optimal tire pressure information, the tire pressure of the tire based on the optimal tire pressure information.

2. The method of claim 1, wherein the optimal tire pressure is calculated by assigning different weights to each of one or more of tread life, traction, driver comfort, noise, fuel economy, blowout prevention, or an environment condition factor.

3. The method of claim 1, further comprising:
   storing, in a memory of the tire inflation device, at least one of a tire serial number, tire position on the vehicle, tire size, or date of manufacture of the tire.

4. The method of claim 1, wherein the tire inflation device is powered by an energy generator that produces mechanical energy based on a relative motion within the tire inflation device.

5. The method of claim 1, wherein the tire inflation device includes a transceiver that is powered by an electromagnetic energy generator that produces electrical energy based on a relative motion within the tire inflation device.

6. The method of claim 1, further comprising:
   measuring a rate of air flow that the automatic tire inflation system is inserting into the tire during a predetermined time period; and
   determining whether there is a structural flaw with the tire based on the rate of air flow.

7. The method of claim 5, further comprising:
   issuing an alert to a user that indicates that there is structural flaw with the tire when the rate of air flow exceeds a threshold during the predetermined time period.

8. An apparatus for pressurizing a tire associated with a vehicle, comprising:
   a processor;
   a memory coupled to the processor, the memory comprising instructions executable by the processor to:
   measure, at a tire inflation device, tire-specific data, wherein the tire-specific data includes at least one of a tire pressure, tire temperature, tire tread depth, rate of change of air volume, or a rate of movement of the tire;
   measure, at the tire inflation device, at least one environment condition associated with the tire, wherein the at least one environment condition includes external air temperature;
   transmit, by a transceiver, the tire-specific data and the at least one environment condition associated with the tire from the tire inflation device to a network entity;
   receive, by the transceiver from the network entity in response to the tire-specific data and the at least one environment condition associated with the tire, an optimal tire pressure information calculated to maximize fuel economy of the vehicle and tread life of the tire; and
   adjust, by the tire inflation device in response to receiving the optimal tire pressure information, the tire pressure of the tire based on the optimal tire pressure information.

9. The apparatus of claim 8, wherein the optimal tire pressure is calculated by assigning different weights to each of one or more of tread life, traction, driver comfort, noise, fuel economy, blowout prevention, or an environment condition factor.

10. The apparatus of claim 8, wherein the processor is further configured to:
    store, in the memory of the tire inflation device, at least one of a tire serial number, tire position on the vehicle, tire size, or date of manufacture of the tire.

11. The apparatus of claim 8, wherein the tire inflation device is powered by an energy generator that produces mechanical energy based on a relative motion within the tire inflation device.

12. The apparatus of claim 8, wherein the apparatus further includes a transceiver that is powered by an electromagnetic energy generator that produces electrical energy based on a relative motion within the tire inflation device.

13. The apparatus of claim 8, wherein the processor is further configured to:
    measure a rate of air flow that the automatic tire inflation system is inserting into the tire during a predetermined time period; and
    determine whether there is a structural flaw with the tire based on the rate of air flow.

14. The apparatus of claim 13, wherein the processor is further configured to:
    issue an alert to a user that indicates that there is structural flaw with the tire when the rate of air flow exceeds a threshold during the predetermined time period.

15. A non-transitory computer-readable medium for pressurizing a tire associated with a vehicle, the computer-readable medium comprising instructions executed to:
    measure, at a tire inflation device, tire-specific data, wherein the tire-specific data includes at least one of a tire pressure, tire temperature, tire tread depth, rate of change of air volume, or a rate of movement of the tire;
    measure, at the tire inflation device, at least one environment condition associated with the tire, wherein the at least one environment condition includes external air temperature;
    transmit, by a transceiver, the tire-specific data and the at least one environment condition associated with the tire from the tire inflation device to a network entity;
    receive, by the transceiver from the network entity in response to the tire-specific data and the at least one environment condition associated with the tire, an optimal tire pressure information calculated to maximize fuel economy of the vehicle and tread life of the tire; and adjust, by the tire inflation device in response to receiving the optimal tire pressure information, the tire pressure of the tire based on the optimal tire pressure information.

16. The computer-readable medium of claim 15, wherein the optimal tire pressure is calculated by assigning different weights to each of one or more of tread life, traction, driver comfort, noise, fuel economy, blowout prevention, or an environment condition factor.

17. The computer-readable medium of claim 15, wherein the instructions are further executable to:

store, in the memory of the tire inflation device, at least one of a tire serial number, tire position on the vehicle, tire size, or date of manufacture of the tire.

18. The computer-readable medium of claim 15, wherein the tire inflation device is powered by an energy generator that produces mechanical energy based on a relative motion within the tire inflation device.

19. The computer-readable medium of claim 15, wherein the apparatus further includes a transceiver that is powered by an electromagnetic energy generator that produces electrical energy based on a relative motion within the tire inflation device.

20. The computer-readable medium of claim 15, wherein the instructions are further executable to:

measure a rate of air flow that the automatic tire inflation system is inserting into the tire during a predetermined time period; and determine whether there is a structural flaw with the tire based on the rate of air flow.

* * * * *